United States Patent
Moon et al.

(10) Patent No.: US 12,272,255 B2
(45) Date of Patent: Apr. 8, 2025

(54) METHOD AND APPARATUS FOR SCHEDULING OF AIRCRAFT FLIGHT

(71) Applicant: SEOUL NATIONAL UNIVERSITY R&DB FOUNDATION, Seoul (KR)

(72) Inventors: Il Kyeong Moon, Seoul (KR); Young Bin Woo, Incheon (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 275 days.

(21) Appl. No.: 17/962,657

(22) Filed: Oct. 10, 2022

(65) Prior Publication Data

US 2023/0132271 A1 Apr. 27, 2023

Related U.S. Application Data

(63) Continuation of application No. PCT/KR2022/013406, filed on Sep. 7, 2022.

(30) Foreign Application Priority Data

Oct. 21, 2021 (KR) .................... 10-2021-0141007

(51) Int. Cl.
*G08G 5/00* (2006.01)
*G06Q 10/02* (2012.01)
(Continued)

(52) U.S. Cl.
CPC ............ *G08G 5/0039* (2013.01); *G06Q 10/02* (2013.01); *G06Q 10/047* (2013.01); *G08G 5/0034* (2013.01); *G08G 5/0043* (2013.01)

(58) Field of Classification Search
CPC .... G08G 5/003; G08G 5/0034; G08G 5/0039; G08G 5/0043; G06Q 10/06311;
(Continued)

(56) References Cited

U.S. PATENT DOCUMENTS 10,395,197 B1 * 8/2019 Salam .............. G06Q 10/06314
10,949,775 B2 3/2021 Petersen
2013/0138333 A1 * 5/2013 Aragones ............. G06Q 10/063
701/120

(Continued)

FOREIGN PATENT DOCUMENTS

CN 101527086 A * 9/2009
KR 1020110123071 A 11/2011

(Continued)

OTHER PUBLICATIONS

Kuhn, Ground delay program planning: Delay, equity, and computational complexity, 2013, Transportation Research Part C (Year: 2013).*

(Continued)

*Primary Examiner* — Russell Frejd
*Assistant Examiner* — Sara J Lewandroski
(74) *Attorney, Agent, or Firm* — Dinsmore & Shohl LLP; Yongsok Choi, Esq.

(57) ABSTRACT

An aircraft flight scheduling apparatus according to an embodiment of the present disclosure includes a database configured to manage an arrival time and a departure time for each aircraft at each airport, aircraft flight data including slot information assigned to each aircraft at each airport, a ground delay program (GDP) information issued by a control center of each airport, a scenario for an expected aircraft flight according to generation of the GDP, and an objective function for determining resetting of an aircraft flight schedule according to the generation of the GDP, a memory for storing an aircraft flight scheduling program, and a processor configured to execute the aircraft flight scheduling program.

9 Claims, 7 Drawing Sheets

(51) Int. Cl.
  *G06Q 10/04*        (2023.01)
  *G06Q 10/047*       (2023.01)
(58) Field of Classification Search
  CPC ..... G06Q 10/063116; G06Q 10/06312; G06Q 10/06313; G06Q 10/06314; G06Q 10/04; G06Q 10/047
  See application file for complete search history.

(56)           References Cited

U.S. PATENT DOCUMENTS

| | | | |
|---|---|---|---|
| 2016/0203722 | A1* | 7/2016 | Liao ................ G08G 5/0043 |
| | | | 701/120 |
| 2018/0101802 | A1* | 4/2018 | Fox ................ G06Q 10/06312 |
| 2019/0066519 | A1 | 2/2019 | Kneuper |
| 2022/0044172 | A1* | 2/2022 | Gong ............. G06Q 10/063118 |
| 2022/0230549 | A1* | 7/2022 | Bollapragada ....... G06Q 10/047 |

FOREIGN PATENT DOCUMENTS

| | | |
|---|---|---|
| KR | 101126920 B1 | 3/2012 |
| KR | 101985112 B1 | 5/2019 |
| KR | 102224957 B1 | 3/2021 |
| KR | 10-2224958 B1 | 8/2021 |

OTHER PUBLICATIONS

Young-Bin Woo et al., Scenario-based stochastic programming for an airline-driven flight rescheduling problem under ground delay programs, Transportation Research Part E 150 (2021) 102360, May 13, 2021.

Young-Jong Lee, et al., "A Study on Simulation-based Method for Implementation of Ground Delay Program for Jeju International Airport," Journal of the Korean Society for Aviation and Aeronautics, Mar. 31, 2015, vol. 23, No. 1, pp. 41-48.

* cited by examiner

FIG. 4

(SET)
- $I$      SET OF AIRCRAFTS
- $K$     SET OF AIRCRAFTS CURRENTLY AFFECTED BY GDP
- $L$      SET OF SECTIONS FOR SETTING DELAY COST
- $S$      SET OF SCENARIOS ($s = 0,1,2,...$)
- $M$    SET OF AIRPORTS WHERE AIRCRAFTS DEPARTURE
- $I_s^{GDP}$    SET OF AIRCRAFTS AFFECTED BY GDP IN SCENARIO s
- $I_s^{GDP}(m)$    SET OF AIRCRAFTS DEPARTING FROM AIRPORT M AFFECTED BY GDP IN SCENARIO s

FIG. 5

(PARAMETERS)

| | |
|---|---|
| $\alpha_i$ | PREVIOUSLY PLANNED ARRIVAL TIME OF AIRCRAFT i AT TARGET AIRPORT |
| $\beta_i$ | PREVIOUSLY PLANNED DEPARTURE TIME OF AIRCRAFT i AT TARGET AIRPORT |
| $\delta^{plane}$ | MINIMUM UNLOADING/LOADING TIME OF AIRCRAFT |
| $\delta^{crew}$ | MINIMUM CONNECTION PREPARATION TIME FOR CREW MEMBER |
| $\delta^{pass}$ | PASSENGER'S MINIMUM CONNECTION PREPARATION TIME |
| $\bar{d}_i^\alpha$ | MAXIMUM PERMISSIBLE DELAY FOR ARRIVAL OF AIRCRAFT i |
| $\bar{d}_i^\beta$ | MAXIMUM PERMISSIBLE DELAY TIME FOR DEPARTURE OF AIRCRAFT i |
| $r_{ij}^{crew}$ | PARAMETER WHICH IS 1 WHEN CREW MEMBER PLANS TO BE CONNECTED FROM AIRCRAFT i TO AIRCRAFT j AND OTHERWISE 0 |
| $r_{ij}^{pass}$ | NUMBER OF PASSENGERS PLANNED TO BE CONNECTED FROM AIRCRAFT i TO AIRCRAFT j |
| $\tau_s$ | TIME AT WHICH NEXT GDP IS EXECUTED IN SCENARIO s |
| $t_{ks}$ | TIME FOR SLOT k OF TARGET AIRPORT IN SCENARIO s |
| $t_l$ | BREAKPOINT OF SECTION l FOR DEFINING INCREMENTAL COST FUNCTION |
| $r_l$ | INTERCEPT FOR SECTION l IN INCREMENTAL COST FUNCTION |
| $c_l^{delay}$ | UNIT COST VALUE FOR SECTION l IN INCREMENTAL COST FUNCTION |
| $c_{ij}^{crew}$ | PENALTY COST FOR CREW MEMBER UNCONNECTED TO AIRCRAFT |
| $c_{ij}^{pass}$ | PENALTY COST FOR PASSENGERS UNCONNECTED TO AIRCRAFT |
| $c^{can}$ | PENALTY CONST FOR FLIGHT CANCELLATION |
| $M$ | ANY LARGE NUMBER |

FIG. 6

DECISION-MAKING VARIABLES $x_{iks}$    FIRST VARIABLE THAT IS 1 WHEN AIRCRAFT $i \in I_s^{GDP}$ IS ASSIGNED TO SLOT k IN SCENARIO s AND OTHERWISE 0

$y_{ijs}^{crew}$    SECOND PARAMETER WHICH IS 1 WHEN CREW MEMBER IS CONNECTED FROM AIRCRAFT i TO AIRCRAFT j IN SCENARIO s AND OTHERWISE 0

$y_{ijs}^{pass}$    THIRD PARAMETER WHICH IS 1 WHEN PASSENGER IS CONNECTED FROM AIRCRAFT i TO AIRCRAFT j IN SCENARIO s AND OTHERWISE 0

$z_{is}$    FOURTH PARAMETER WHICH IS 1 WHEN AIRCRAFT i IS CANCELED IN SCENARIO s AND OTHERWISE 0

$d_{is}^{\alpha}$    ARRIVAL DELAY TIME OF AIRCRAFT i IN SCENARIO s $d_{is}^{\beta}$    DEPARTURE DELAY TIME OF AIRCRAFT i IN SCENARIO s $w_{is}^{\alpha}$    ARRIVAL DELAY COST OF AIRCRAFT i IN SCENARIO s $w_{is}^{\beta}$    DEPARTURE DELAY COST OF AIRCRAFT i IN SCENARIO s

FIG. 7

$$\min_{s \in S} \mathbb{E}\left\{\sum_{i \in I_s^{GDP}}(w_{is}^\alpha + w_{is}^\beta) + \sum_{i,j \in I} c_{ij}^{crew} r_{ij}^{crew} y_{ijs}^{crew} + \sum_{i,j \in I} c_{ij}^{pass} r_{ij}^{pass} y_{ijs}^{pass} + \sum_{i \in I_s^{GDP}} c^{can} z_{is}\right\} \quad (1)$$

s.t.

$$c_l^{delay} d_{is}^\alpha + r_l \leq w_{is}^\alpha \qquad \forall s \in S, i \in I_s^{GDP}, l \in L \quad (2)$$

$$c_l^{delay} d_{is}^\beta + r_l \leq w_{is}^\beta \qquad \forall s \in S, i \in I_s^{GDP}, l \in L \quad (3)$$

$$\sum_{i \in I_s^{GDP}: \alpha_i \leq t_{ks}} x_{iks} \leq 1, \qquad \forall s \in S, k \in K_s \quad (4)$$

$$\sum_{k \in K_s: \alpha_i \leq t_{ks}} x_{iks} + z_{is} = 1, \qquad \forall s \in S, i \in I_s^{GDP} \quad (5)$$

$$x_{ik0} = x_{iks'} \qquad \forall s \in S\setminus\{0\}, i \in I_s^{GDP}, k \in K: t_{ks} < \tau_s \quad (6)$$

$$d_{is}^\alpha = \sum_{k \in K_s: \alpha_i \leq t_{ks}} (t_{ks} - \alpha_i) x_{iks}, \qquad \forall s \in S, i \in I_s^{GDP} \quad (7)$$

$$\sum_{k \in K_s} t_{ks} x_{iks} + \delta^{plane} - \beta_i \leq d_{is}^\beta, \qquad \forall s \in S, i \in I_s^{GDP} \quad (8)$$

$$\alpha_i + \delta^{crew} + d_{is}^\alpha - M y_{ijs}^{crew} \leq \beta_j + d_{js}^\beta \qquad \forall s \in S, i, j \in I: r_{ij}^{crew} = 1 \quad (9)$$

$$\alpha_i + \delta^{pess} + d_{is}^\alpha - M y_{ijs}^{pess} \leq \beta_j + d_{js}^\beta \qquad \forall s \in S, i, j \in I: r_{ij}^{pess} > 0 \quad (10)$$

$$\alpha_i + d_{is}^\alpha \leq \alpha_j + d_{js}^\alpha + \bar{d}_j^\alpha z_{js} \qquad \forall s \in S, m \in M, i, j \in I_s^{GDP}(m): \alpha_i < \alpha_j \quad (11)$$

$$z_{is} \leq y_{ijs}^{crew}, \qquad \forall s \in S, i \in I_s^{GDP}, j \in I: r_{ij}^{crew} = 1 \quad (12)$$

$$z_{js} \leq y_{ijs}^{crew}, \qquad \forall s \in S, i \in I, j \in I_s^{GDP}: r_{ij}^{crew} = 1 \quad (13)$$

$$z_{is} \leq y_{ijs}^{pass}, \qquad \forall s \in S, i \in I_s^{GDP}, j \in I: r_{ij}^{pess} > 0 \quad (14)$$

$$z_{js} \leq y_{ijs}^{pass}, \qquad \forall s \in S, i \in I, j \in I_s^{GDP}: r_{ij}^{pess} > 0 \quad (15)$$

$$x_{iks}, z_{is}, y_{ijs}^{crew}, y_{ijs}^{pass} \in \mathbb{B}, \qquad \forall s \in S, i, j \in I_s^{GDP}, k \in K \quad (16)$$

$$0 \leq d_{is}^\alpha \leq \bar{d}_i^\alpha, \qquad \forall s \in S, i \in I_s^{GDP} \quad (17)$$

$$0 \leq d_{is}^\beta \leq \bar{d}_i^\beta, \qquad \forall s \in S, i \in I_s^{GDP} \quad (18)$$

METHOD AND APPARATUS FOR SCHEDULING OF AIRCRAFT FLIGHT

CROSS-REFERENCE TO RELATED APPLICATION

This application is a continuation of International Application No. PCT/KR2022/013406 filed on Sep. 7, 2022, which claims priority to Korean Patent Application No. 10-2021-0141007 filed on Oct. 21, 2021, the entire contents of which are herein incorporated by reference.

BACKGROUND

1. Field

The present disclosure relates to a method and an apparatus for scheduling of aircraft flight.

2. Description of the Related Art

Aircraft flights are affected by various kinds of uncertainties, such as bad weather, aircraft maintenance, passenger boarding delay, and a failure at an adjacent airport. In general, when duration of an incident such as aircraft maintenance or passenger boarding delay is relatively short, it is possible to respond thereto by using a buffer time previously allocated to the flight. However, in case of an event such as bad weather or a failure at an adjacent airport, aircrafts that have not yet departed from a target airport are placed on standby to ensure stability.

The air traffic control center (ATCC) activates a ground delay program (GDP) to restrict a real-time acceptance rate of passenger logistics to secure safety of an aircraft operating system when a bad weather condition occurs. In this case, a real-time throughput rate of passenger logistics means the number of passenger flights landing at a target airport per hour. When the real-time throughput rate is adjusted downward for a specific time period, all relevant flights on that aircraft will be delayed or canceled to match the adjusted throughput rate. In this case, the GDP indicates a delay of an aircraft on the ground by adjusting a take-off time at a departure airport of the flight. An aircraft has to be controlled near a runway from a control tower at a slot time provided by the airport, and since waiting in the air to meet the modified slot time is effective in cost, the GDP is evaluated as a cost-effective delay alternative.

When GDP is executed at a specific airport by the ATCC, the affected flights are assigned to the modified slot time or canceled. In this case, the GDP is executed by focusing on securing stability of an aircraft operating system. However, a modified schedule may not match an internal operating goal of an airline that owns an aircraft. For example, a certain airline may be more concerned with ensuring flight punctuality and schedule fulfillment, thereby wanting a schedule that minimizes business losses (or penalties) resulting from delays in take-off and landing and flight cancellations.

The related art establishes an operational goal improvement by exchanging departure and arrival times of flights that have not yet been operated under given critical information in order to minimize effects of a GDP. However, re-establishing an aircraft schedule by using only decisive information has a limitation in that flexibility of aircraft flight is not ensured because future failure situations are not considered. For example, an aircraft schedule modified by using only decisive information at a fragmented point in time may not reach effective operational goal improvement when the schedule needs to be modified once more in a worsening (or easing) GDP situation.

An example of related art includes Korean Patent Publication No. 10-2224958 (Title of the invention: AVIATION INFORMATION MANAGEMENT SYSTEM).

SUMMARY

An object of the present disclosure is to provide an aircraft flight scheduling apparatus and an aircraft flight scheduling method that may adjust an operation schedule of a subsequent aircraft in response to a GDP executed by an airport from a viewpoint of each airline that operates aircrafts.

However, technical objects to be achieved by the present embodiment are not limited to the technical objects described above, and there may be other technical objects.

As a technical means for achieving the above-described technical problem, an aircraft flight scheduling apparatus according to an embodiment of the present disclosure includes a database configured to manage an arrival time and a departure time for each aircraft at each airport, aircraft flight data including slot information assigned to each aircraft at each airport, a ground delay program (GDP) information issued by a control center of each airport, a scenario for an expected aircraft flight according to generation of the GDP, and an objective function for determining resetting of an aircraft flight schedule according to the generation of the GDP, a memory for storing an aircraft flight scheduling program, and a processor configured to execute the aircraft flight scheduling program, wherein the aircraft flight scheduling program applies the objective function to each scenario when receiving GDP generation information and calculates a changed optimal flight schedule of the aircraft based on the scenario.

In addition, an aircraft flight scheduling method using an aircraft flight scheduling apparatus, according to another embodiment of the present disclosure, includes providing a database configured to manage an arrival time and a departure time for each aircraft at each airport, aircraft flight data including slot information assigned to each aircraft at each airport, a ground delay program (GDP) information issued by a control center of each airport, a scenario for an expected aircraft flight according to generation of the GDP, and an objective function for determining resetting of an aircraft flight schedule according to the generation of the GDP, and applying the objective function to each scenario when receiving GDP generation information for an airport and calculating a changed optimal flight schedule of the aircraft based on the scenario.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a set necessary for generating a mathematical model according to an embodiment of the present disclosure;

FIG. 5 illustrates parameters necessary for generating a mathematical model according to an embodiment of the present disclosure;

FIG. 6 illustrates decision-making variables necessary for generating a mathematical model according to an embodiment of the present disclosure; and FIG. 7 illustrates an objective function and various limiting conditions for calculating a changed flight schedule, according to an embodiment of the present disclosure.

DETAILED DESCRIPTION

Figure 1:
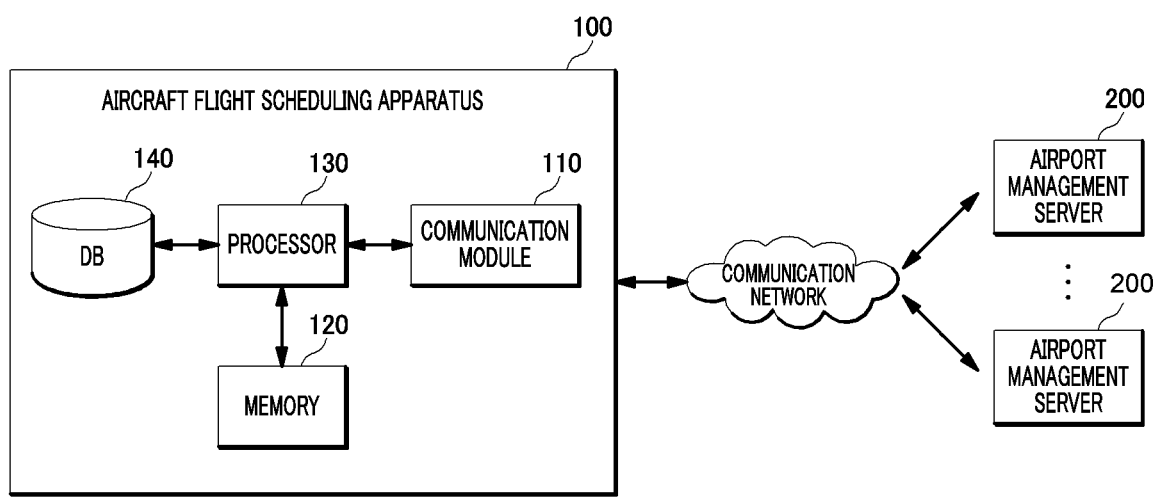
FIG. 1 is a configuration diagram of an aircraft flight scheduling system according to an embodiment of the present disclosure.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" or "coupled" to another portion, this includes not only a case of being "directly connected or coupled" but also a case of being "electrically connected" with another element interposed therebetween. In addition, when a portion "includes" a certain component, this means that other components may be further included therein rather than excluding other components, unless otherwise stated.

In this specification, a "part" includes a unit realized by hardware or software, and a unit realized by using both, and one unit may be implemented by using two or more hardware, and two or more units may be implemented by one hardware. Meanwhile, '~section' is not limited to software or hardware, and '~section' may be configured to be in an addressable storage medium or may be configured to regenerate one or more processors. Accordingly, as an example, '~section' indicates configuration elements such as software configuration elements, object-oriented software configuration elements, class configuration elements, and task configuration elements, and progresses, functions, properties, and procedures, subroutines, segments of program code, drivers, firmware, microcode, circuitry, data, databases, data structures, tables, arrays, and variables. The functions provided in the configuration elements and '~sections' may be combined into a smaller number of configuration elements and '~sections' or further separated into additional configuration elements and '~sections'. In addition, configuration elements and '~sections' may be implemented to regenerate one or more CPUs in a device or secure multimedia card.

A network indicates a connection structure in which information may be exchanged between respective nodes such as terminals and servers and includes a local area network (LAN), a wide area network (WAN), the Internet (world wide web (WEB)), a wired and wireless data network, a telephone network, a wired and wireless television network, and so on. The wireless data communication network includes, for example, 3 generation (3G), 4G, 5G, 3rd generation partnership project (3GPP), long term evolution (LTE), world interoperability for microwave access (WIMAX), Wi-Fi, Bluetooth communication, infrared communication, ultrasonic Communication, visible light communication (VLC), LiFi, and so on but are not limited thereto.

In the present specification, a user terminal may be implemented by a computer or a portable terminal capable of accessing a server or another computing device through a network. Here, the computer may include, for example, a notebook computer, a desktop computer, or a laptop computer in which a web browser is installed, and the portable terminal is, for example, a wireless communication device that ensures portability and mobility and may include various smartphones and all kinds of handheld-based wireless communication devices such as tablet PCs.

FIG. 1 is a configuration diagram of an aircraft flight scheduling system according to an embodiment of the present disclosure.

Referring to FIG. 1, an aircraft flight scheduling system 10 includes an aircraft flight scheduling apparatus 100 that is managed for each airline and a plurality of airport management servers 200.

The aircraft flight scheduling apparatus 100 is a computing device operated by each airline and manages data on all aircrafts operated by the airline. To this end, the aircraft flight scheduling apparatus 100 includes a communication module 110, a memory 120, a processor 130, and a database 140.

First, the database 140 manages aircraft flight data including arrival time and departure time for each aircraft at each airport, and slot information allocated to each aircraft at the corresponding airport. In addition, the database 140 manages information issued by a control center of each airport. In addition, the database 140 manages each scenario for aircraft flight expected according to generation of a ground delay program (GDP). In addition, the database 140 manages an objective function for determining resetting of an aircraft flight schedule according to the generation of GDP.

Next, the communication module 110 a communication module that uses a wired network such as a local area network (LAN), a wide area network (WAN) or a value added network (VAN) or all kinds of wireless networks such as a mobile radio communication network or a satellite communication network. In particular, the communication module 110 provides a communication interface communicating with respective airport management servers 200 connected to each other through an external communication network.

The memory 120 stores an aircraft flight scheduling program. As the aircraft flight scheduling program receives GDP generation information from the respective airport management servers 200, the objective function is applied to each scenario at the corresponding airport to calculate a changed flight schedule of an aircraft.

The memory 120 may be configured with either a non-volatile storage device that continuously maintains stored information even when power is not supplied, or a volatile storage device that requires power to maintain the stored information. In addition, the memory 120 may perform a function of temporarily or permanently storing data processed by the processor 130. The memory 120 may include magnetic storage media or flash storage media in addition to the volatile storage device that requires power to maintain the stored information, but the scope of the present disclosure is not limited thereto.

The processor 130 executes an aircraft flight scheduling program stored in the memory 120. The processor 130 may include various devices for controlling and processing data. The processor 130 may refer to a data processing device that includes a physically structured circuit to perform a function expressed as a code or an instruction included in a program and that is embedded in hardware. In one example, the processor 130 may be implemented in a form of a microprocessor, a central processing unit (CPU), a processor core, a multiprocessor, an application-specific integrated circuit (ASIC), or a field programmable gate array (FPGA), but the scope of the present disclosure is not limited thereto.

Meanwhile, the aircraft flight scheduling apparatus 100 may operate as a server that provides the changed aircraft flight schedule information to various external user terminals related to aircraft flight or to the airport management server 200. In this case, the aircraft flight scheduling apparatus 100 may operate in a cloud computing service model such as software as a service (SaaS), platform as a service (PaaS), or infrastructure as a service (IaaS). In addition, the aircraft flight scheduling apparatus 100 may be implemented in a form such as a private cloud, a public cloud, or a hybrid cloud.

Figure 2:
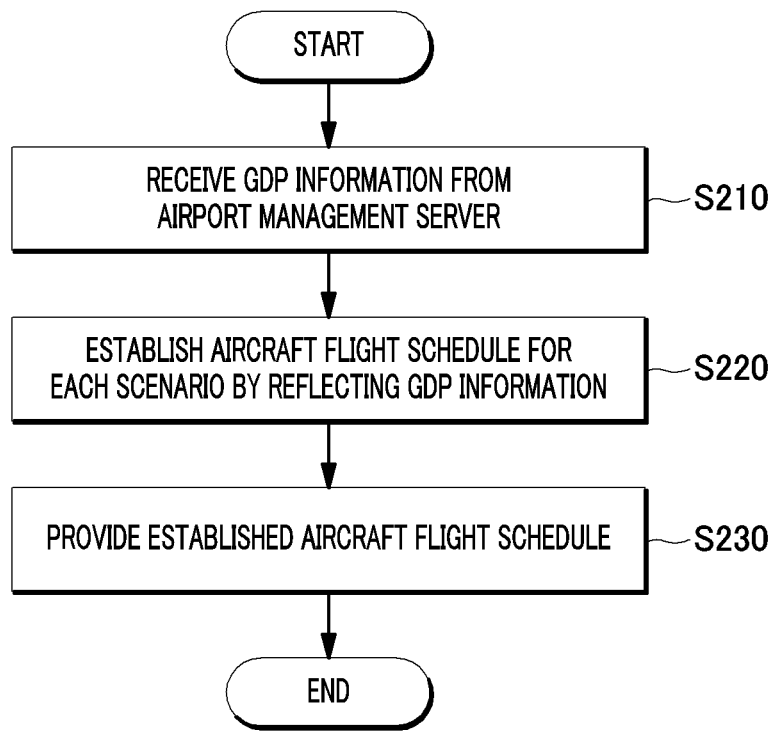
FIG. 2 is a flowchart illustrating an aircraft flight scheduling method according to an embodiment of the present disclosure.
Figure 3:
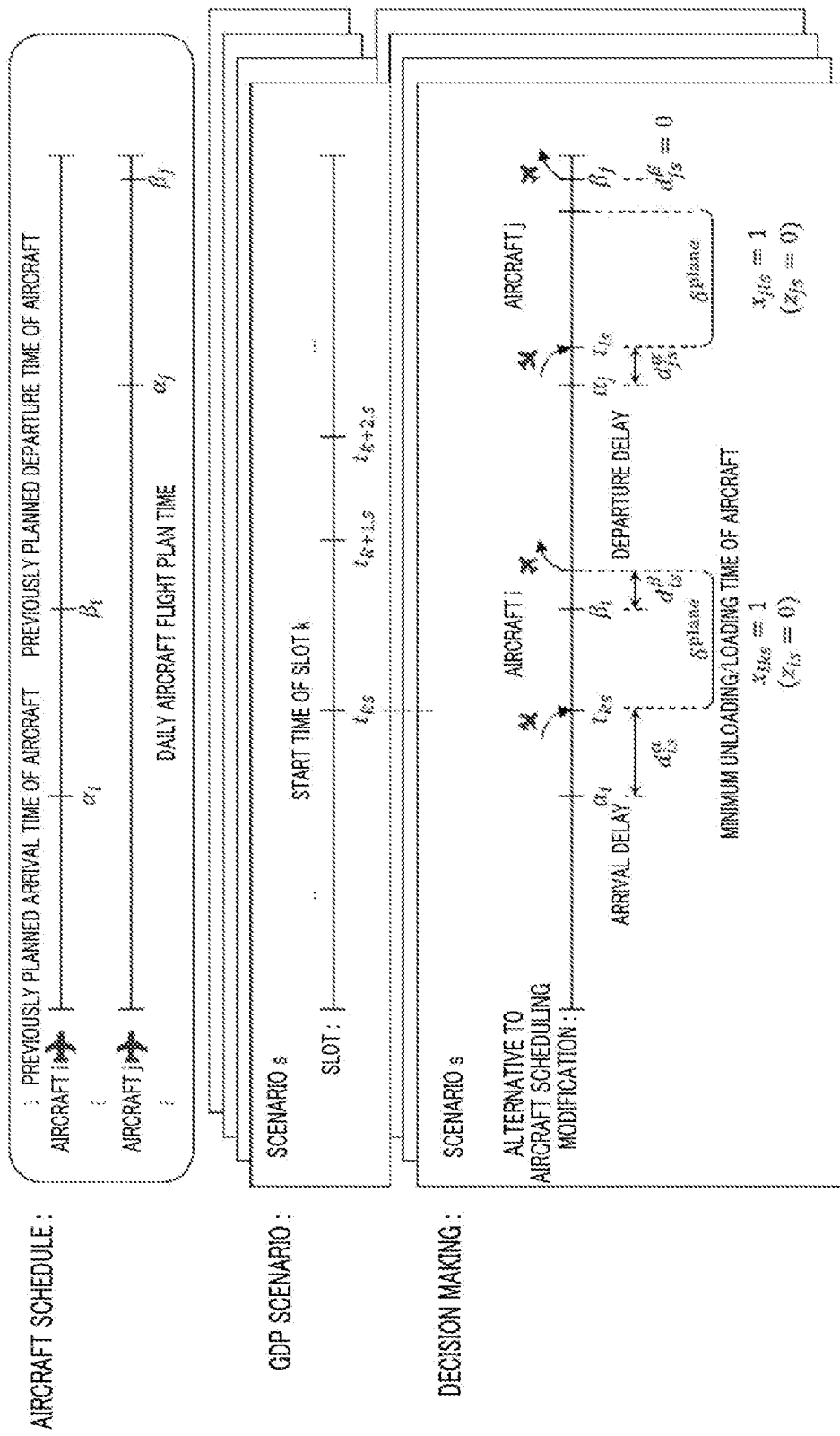
FIG. 3 is a diagram illustrating the aircraft flight scheduling method according to an embodiment of the present disclosure.

FIG. 2 is a flowchart illustrating an aircraft flight scheduling method according to an embodiment of the present disclosure, and FIG. 3 is a diagram illustrating the aircraft flight scheduling method according to the embodiment of the present disclosure.

First, the aircraft flight scheduling apparatus 100 manages data related to flight of each aircraft in real time based on information managed through a database. For example, the aircraft flight scheduling apparatus 100 manage in real time information on crew members and passengers who are boarding an aircraft, arrival time to each airport of the corresponding aircraft, departure time from each airport, slot information allocated from each airport, and so on. In this case, information on each crew member and each passenger may include connection information of each crew member to a next flight, and connection information of each passenger to a next flight, in addition to various types of identification information.

As illustrated in FIG. 3, the aircraft flight scheduling apparatus 100 manages an aircraft schedule plan based on information on arrival time and departure time at each airport of each aircraft. As illustrated in FIG. 3, it is possible to check aircrafts and a flight plan scheduled by an airline plans on a daily basis. The flight schedule is established in advance, and when there are no obstacles, the flight will precede as planned. At a target airport, each aircraft is assigned organization time thereof according to the schedule. The aircraft must land at the destination airport on time. After landing, the next flight schedule after loading and loading time of the next passengers and crew members is performed. In this case, when a take-off time of the next flight is delayed from the planned schedule, the flight schedule is performed at the earliest time after the loading and loading time.

The aircraft flight scheduling apparatus 100 manages a plurality of scenarios according to generation of a GDP. Various scenarios may be defined depending on points in time when the GDP is generated during implementation of a basic aircraft flight plan. In addition, in some cases, a case in which a plurality of GDPs are continuously set in one scenario may be considered. It is not known exactly how the GDP will be updated in the future, but several scenarios may be estimated which may be performed according to factors generated by the GDP. Estimation of the scenario may be made by using a change in real-time throughput rates and GDP records of historical airports. A method of estimating a scenario is outside the scope of the present disclosure, and it is assumed that a set of scenario information is previously given. Here, information of the scenario includes a point in time when a GDP occurs, a target aircraft under control, and a modified slot time of the aircraft.

Next, the aircraft flight scheduling apparatus 100 receives GDP information actually generated from the airport management server 200 (S210).

In this case, the GDP information includes the time when GDP is executed, an aircraft to which the GDP is applied, and information on an adjusted take-off time of the aircraft. Since the GDP information is classified for each airport, the aircraft flight scheduling apparatus 100 may manage identification information of the airport that generates the GDP information. When receiving the GDP information, the aircraft flight scheduling apparatus 100 checks whether the aircraft to which the GDP is applied is an aircraft that is managed thereby.

Next, an aircraft flight schedule is calculated for each scenario by reflecting the received GDP information (S220).

In the case illustrated in FIG. 3, departure and arrival times modified at the time when GDP is executed are transferred, and each scenario represents a case in which the departure and arrival times are adjusted upward in the future. As the GDP is executed at t=0, a scenario s represents a case in which the GDP is modified to adjust the departure and arrival times upward after a time $\tau_s$. In this case, looking at the modified scenario, it can be seen that the time required for take-off or landing is adjusted for each aircraft while maintaining the minimum loading and loading time for each aircraft.

When departure and arrival times are adjusted, an airline may modify a flight schedule by exchanging unique departure and arrival times between aircraft. As such, an alternative amendment has to be determined within at least 20 minutes. The airline may modify the flight schedule such that delay time for a flight entering a target airport and a flight leaving the target airport may be different from each other. Alternatively, it is possible to determine cancel of a specific flight.

An airline aims to implement flights with less variation than the previously established flight schedules. The schedule change is calculated based on a penalty cost for delay and a penalty cost for cancel of flight. Accordingly, the aircraft flight scheduling apparatus 100 may establish an aircraft schedule modification to minimize daily total penalty cost.

The aircraft flight scheduling apparatus 100 may perform a method of exchanging departure and arrival times of flights that are not yet performed among daily flight schedules after a GDP is executed. Basically, it is possible to consider a method of modifying a schedule of the remaining flights when GDP information is transferred to the airline. However, since a level of the GDP may be raised after the GDP is executed, such as a delay prolonged by the GDP due to bad weather or so on in the near future, scheduling using only partial GDP information at the moment may cause significant penalties in the future. Accordingly, the present disclosure proposes a decision-making framework for modifying a schedule of remaining flights by using a scenario in which a future GDP may be raised at the time when a GDP is executed or updated.

The aircraft flight scheduling apparatus 100 calculates a changed flight schedule for each scenario by using mathematical models defined by FIGS. 4 to 7.

FIG. 4 illustrates a set necessary for generating a mathematical model, FIG. 5 illustrates parameters necessary for generating the mathematical model, FIG. 6 illustrates decision-making variables necessary for generating the mathematical model, and FIG. 7 illustrates an objective function and various limiting conditions for calculating a changed flight schedule.

A set includes a set of aircrafts, a set of aircrafts currently affected by a GDP, a set of sections for setting a delay cost, a set of scenarios, a set of airports where aircrafts departure, a set of aircrafts affected by the GDP in a scenario s, and a set of aircrafts departing from an airport m affected by the GDP in the scenario s.

The parameters include a previously planned arrival time of an aircraft i at a target airport, a previously planned departure time of the aircraft i at the target airport, a minimum unloading/loading time of an aircraft, a minimum connection preparation time for a crew member, a passenger's minimum connection preparation time, a maximum permissible delay for arrival of the aircraft I, a maximum permissible delay time for departure of the aircraft I, a parameter which is 1 when a crew member plans to be connected from the aircraft i to an aircraft j and otherwise 0, the number of passengers planned to be connected from the aircraft i to the aircraft j, a time at which the next GDP is executed in scenario s, a time for a slot k of a target airport in the scenario s, a breakpoint of a section l for defining an incremental cost function, an intercept for the section l in the incremental cost function, a unit cost value for the section l in the incremental cost function, a penalty cost for a crew member unconnected to an aircraft, a penalty cost for passengers unconnected to an aircraft, a penalty const for flight cancellation, any large number, and so on.

The decision-making variables includes a first variable that is 1 when an aircraft $i \in_{I_s}^{GDP}$ is assigned to the slot k in a scenario s and otherwise 0, a second parameter which is 1 when a crew member is connected from the aircraft i to the aircraft j in the scenario s and otherwise 0, a third parameter which is 1 when a passenger is connected from the aircraft i to the aircraft j in the scenario s and otherwise 0, a fourth parameter which is 1 when the aircraft i is canceled in the scenario s and otherwise 0, an arrival delay time of the aircraft i in the scenario s, a departure delay time of the aircraft i in the scenario s, an arrival delay cost of the aircraft i in the scenario s, and a departure delay cost of the aircraft i in scenario s.

In addition, a stochastic planning method of re-establishing an aircraft schedule in a situation of GDP generation is implemented by using the following objective function.

Equation (1) representing the objective function is a function that minimizes a total expected penalty cost for each scenario. The first term in Equation (1) is a term representing a cost due to a unit time delay of a flight, the second term is a term representing a cost when a crew member is not connected, the third term is a term representing a cost when a passenger is not connected, the fourth term is a term representing a cost due to cancellation of flight, and the objective function calculates an optimal flight schedule that minimizes the sum of the four terms.

A scenario 0 represents a current schedule for which GDP has been executed recently. When GDP remains unchanged, the scenario 0 is implemented. Meanwhile, when GDP changes, GDP information is updated, and only the schedule after the change may be modified.

Constraint (2) and Constraint (3) calculate penalty costs for an arrival delay and a departure delay. The penalty costs are calculated differently according to a section to which a delay time belongs by an incremental cost function. This reflects that a delay exceeding 15 minutes have a greater influence on operational performance than a delay of less than 15 minutes in calculating a penalty cost for aircraft flight.

In Constraint (4), a slot may be associated with at most one aircraft, and in Constraint (5), an aircraft may be assigned to one slot or canceled.

Constraint (6) indicates that, in a scenario to be implemented later, slot assignment of an aircraft before the time when the next GDP is executed may not be modified.

Constraint (7) and Constraint (8) calculate an arrival delay and a departure delay of an aircraft implemented in each scenario.

Constraint (9) and Constraint (10) define conditions for connecting passengers to crew members.

Constraint (11) indicates that a time for preparing the next departure flight after an aircraft arrives at a target airport has to be longer than minimum unloading and loading times.

Constraint (12) to Constraint (15) restrict that a relevant passengers and crew members may not be connected to each other when an aircraft is canceled.

Constraint (16) to Constraint (18) define decision-making variables.

Meanwhile, the objective function may be customized for each airline in consideration of various resources such as an aircraft possessed by the airline, or an allocated slot. That is, the objective function is customized by considering evaluation criteria items and weights of aircraft flight in accordance with internal operation goals set by each airline. In this case, the customized parameters include a unit penalty $c_i^{delay}$ in the form of an incremental function for a flight delay time, a penalty $c_{ij}^{crew}$ for the number of unconnected crew members, a penalty $c_{ij}^{pass}$ for the number of passengers unconnected to a connection flight, and a penalty $c^{can}$ for the number of flight cancellations.

By implementing the objective function for optimization as described above, an optimal flight schedule for minimizing a total expected penalty cost according to generation of a GDP is calculated. The calculated aircraft schedule includes reallocation of slots for each scenario and a planned delay and cancellation of an aircraft. That is, airlines may operate basically an aircraft schedule for a basic scenario in which a current operation state does not change such as generation of a GDP, and when a GDP targeted for a certain scenario is actually implemented in the future, an aircraft may be customized by reflecting the aircraft schedule calculated for the scenario.

An aircraft flight scheduling method according to an embodiment of the present disclosure described above may be implemented in a form of a recording medium including instructions executable by a computer such as a program module executed by a computer. Computer-readable media may be any available media that may be accessed by a computer and includes all volatile and non-volatile media, removable and non-removable media. In addition, the computer-readable media may include all computer storage media. The computer storage media includes all volatile and nonvolatile, removable and non-removable media implemented in any method or technology for storage of information such as computer readable instructions, data structures, program modules, or other data.

When a failure occurs at an airport, making decision to re-establish schedules for aircrafts that have not yet been operated from the airline's point of view is supported by reflecting flight operation information in real time through the above-described configuration of the present disclosure. In particular, optimal decision is made for each scenario, and thus, it is possible to establish an optimal flight schedule in preparation for various GDP occurrences.

In addition, the system according to the present disclosure provides optimality of an expected cost function for each situation by considering possible scenarios in the future. A user may make decisions by applying differently weights and performance indicators such as flight delay time, unconnected flights, and canceled flights.

Through this, it is possible to greatly reduce the waste of aviation resources from the point of view of decision makers for each airline when an aircraft flight fails. In addition, when the latest flight operation information is updated to ensure stochastic optimality in real time, re-establishment of an aircraft schedule is explored, and establishment of a schedule customized to the performance indicators and weights set by a decision maker in advance is automated. In addition, situation-specific decision-making for possible future scenarios is explored together, and rapid response to uncertainly changing obstacles may be made.

Although the methods and systems of the present disclosure have been described with reference to specific embodiments, some or all of their configuration elements or operations may be implemented by using a computer system having a general purpose hardware architecture.

The above description of the present disclosure is for illustration, and those of ordinary skill in the art to which the present disclosure pertains may understand that it may be easily modified into other specific forms without changing the technical spirit or essential features of the present disclosure. Therefore, it should be understood that the embodiments described above are illustrative in all respects and not restrictive. For example, each configuration element described as a single type may be implemented in a dispersed form, and likewise configuration elements described as distributed may also be implemented in a combined form.

The scope of the present disclosure is indicated by the following claims rather than the above detailed description, and all changes or modifications derived from the meaning and scope of the claims and their equivalent concepts should be interpreted as being included in the scope of the present disclosure.

Mode for Implementing Invention

A mode for implementing the invention is the same as the best mode for implementing the invention described above.

INDUSTRIAL APPLICABILITY

The present disclosure is applicable to an aircraft industry as an aircraft flight scheduling technology, thereby having industrial applicability.

What is claimed is:

1. An aircraft flight scheduling system comprising:
one or more control centers of one or more airports; and
aircraft flight scheduling apparatus comprising:
a database configured to manage an arrival time and a departure time for one or more aircrafts at the one or more airports, aircraft flight data including slot information assigned to the one or more aircrafts at the one or more airports, a ground delay program (GDP) information issued by the one or more control centers of the one or more airports, a scenario for an expected aircraft flight according to generation of the GDP, and an objective function for determining resetting of an aircraft flight schedule according to the generation of the GDP;
a memory for storing an aircraft flight scheduling program; and
a processor configured to execute the aircraft flight scheduling program,
wherein the aircraft flight scheduling program applies the objective function to a scenario when receiving GDP generation information and calculates a changed optimal flight schedule of the one or more aircrafts based on the scenario, and
wherein the one or more control centers control operations of the one or more aircrafts based on the changed optimal flight schedule.

2. The aircraft flight scheduling system of claim 1, wherein
the aircraft flight scheduling program performs aircraft flight scheduling for aircrafts operated in units of airlines.

3. The aircraft flight scheduling system of claim 1, wherein
the objective function is a function that minimizes a total expected penalty cost for the scenario and includes a sum of a term representing a cost due to a unit time delay of a flight, a term representing a cost when a crew member is not connected, a term representing a cost when a passenger is not connected, and a term representing a cost due to a flight cancellation.

4. The aircraft flight scheduling system of claim 3, wherein
the aircraft flight scheduling program calculates the objective function based on a constraint for calculating a penalty cost for an arrival delay and a departure delay, a constraint in which a slot is associated with at most one aircraft, a constraint indicating that the aircraft is able to be assigned to one slot or canceled, a constraint indicating that a slot assignment of the aircraft before a time that a next GDP is executed is not modified in a scenario to be implemented later, a constraint on the arrival delay and the departure delay of an aircraft to be implemented in the scenario, a constraint indicating that, after the aircraft arrives at a target airport, a time for preparing for a next departure flight has to be longer than a minimum unloading/loading time, and a constraint indicating that a relevant passenger is not connected to a crew member when a flight is canceled.

5. The aircraft flight scheduling system of claim 1, further comprising:
the one or more aircrafts,
wherein the one or more aircrafts operate based on the changed optimal flight schedule.

6. An aircraft flight scheduling method using an aircraft flight scheduling apparatus, the aircraft flight scheduling method comprising:
providing a database configured to manage an arrival time and a departure time for each of one or more aircrafts at each of one or more airports, aircraft flight data including slot information assigned to each of the one or more aircrafts at each of the one or more airports, a ground delay program (GDP) information issued by one or more control centers of the one or more airports, a scenario for an expected aircraft flight according to generation of the GDP, and an objective function for determining resetting of an aircraft flight schedule according to the generation of the GDP;
applying the objective function to the scenario when receiving GDP generation information for an airport and calculating a changed optimal flight schedule of the aircraft based on the scenario; and controlling, by one or more control centers, operations of the one or more aircrafts based on the changed optimal flight schedule.

7. The aircraft flight scheduling method of claim 6, wherein
the objective function is a function that minimizes a total expected penalty cost for the scenario and includes a sum of a term representing a cost due to a unit time delay of a flight, a term representing a cost when a crew member is not connected, a term representing a cost when a passenger is not connected, and a term representing a cost due to a flight cancellation.

8. The aircraft flight scheduling method of claim 7, further comprising:
calculating the objective function based on a constraint for calculating a penalty cost for an arrival delay and a departure delay, a constraint in which a slot is associated with at most one aircraft, a constraint indicating that the aircraft is able to be assigned to one slot or canceled, a constraint indicating that a slot assignment of the aircraft before a time that a next GDP is executed is not modified in a scenario to be implemented later, a constraint on the arrival delay and the departure delay of an aircraft to be implemented in the scenario, a constraint indicating that, after the aircraft arrives at a target airport, a time for preparing for a next departure flight has to be longer than a minimum unloading/loading time, and a constraint indicating that a relevant passenger is not connected to a crew member when a flight is canceled.

9. The aircraft flight scheduling method of claim 6, wherein
the calculation of the changed optimal flight schedule is to perform aircraft flight scheduling for aircrafts operated in units of airlines.

* * * * *